WIRE WOUND INDUCTORS/COMPONENT SUBSTRATE ASSEMBLIES

Filed Nov. 8, 1966

United States Patent Office 3,403,298
Patented Sept. 24, 1968

3,403,298
WIRE WOUND INDUCTORS/COMPONENT SUBSTRATE ASSEMBLIES

Howard D. Richards and Anthony W. Simpson, Ilford, England, assignors to The Plessey Company Limited, Ilford, England, a British company Filed Nov. 8, 1966, Ser. No. 592,768
Claims priority, application Great Britain, Nov. 9, 1965, 47,375/65
2 Claims. (Cl. 317—99)

ABSTRACT OF THE DISCLOSURE

An electric substrate assembly comprising electrical components and conductors deposited on a magnetic substrate having a recess for receiving a magnetic core structure which supports a wire wound inductor, the reluctance of the magnetic circuit formed between the substrate and the inductor is varied by an adjustable magnetic bridging member associated with a suitable air gap in the magnetic circuit.

This invention relates to electric circuit assemblies and relates more specifically to such assemblies of the form in which one or more electric components are applied to a substrate, as for example by methods using printing or evaporation techniques.

Miniature electric circuit assemblies may be constructed by printing or evaporating suitable patterns of conducting and insulating films onto a substrate such as glass. The conducting films from the conductors and resistors and the insulating films form the dielectrics for the capacitors, and crossover points of the electronic circuit. One of the drawbacks of this method of constructing miniature circuits is the difficulty of making large value inductors and transformers. Small inductors may be made by evaporating or printing spiral patterns on to the substrate; however, these inductors not only have the disadvantage of low value per unit area, but also produce large stray fields that could cause interaction between adjacent circuits.

According to the present invention there is provided a circuit assembly of the form hereinbefore defined in which the substrate is of so-called "soft" magnetic, electrically insulating material and serves as at least part of a magnetic circuit of an inductor defined by the substrate and electric conductor means associated with it.

The inductor may comprise a conductor deposited on the surface of said magnetic substrate, or, alternatively, it may comprise a conductor wound on to the said substrate, with that part or parts of the substrate forming a magnetic core of the inductor being either an integral part of the substrate or a removable section.

The inductor may conveniently comprise adjusting means for varying the reluctance of the magnetic circuit.

The magnetic substrate may be conveniently surfaced with material affording a smoother external surface than that of the substrate.

Figure 1:
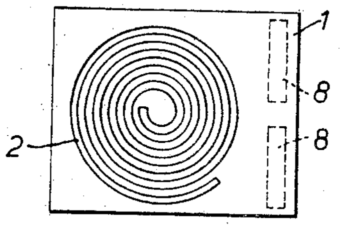
Figure 2A:
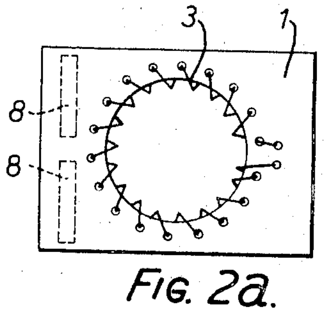
Figure 2B:
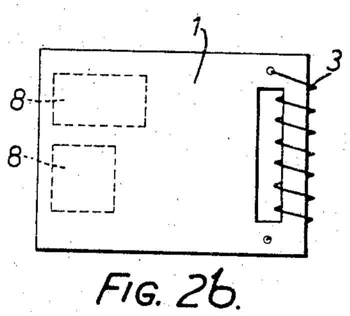
Figure 2C:
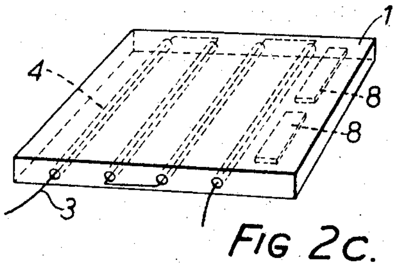
Figure 3A:
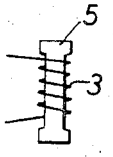
Figure 3B:
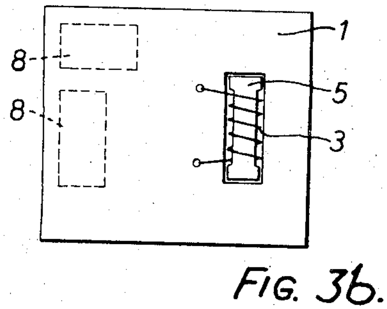
Figure 4A:
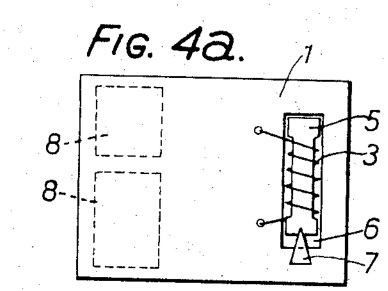
Figure 4B:
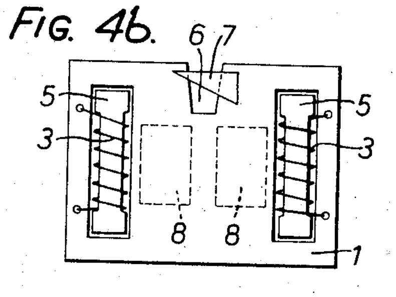

The foregoing and other features of the invention will be evident from the following description of some exemplary embodiments of the invention and which refers to the accompanying drawing in which:

FIGURE 1 shows a thin film spiral inductor;

FIGURES 2*a*, 2*b*, and 2*c* show the construction of inductors wound on a magnetic substrate;

FIGURES 3*a* and 3*b* show the construction of inductors wound on separate magnetic cores; and FIGURES 4*a* and 4*b* show methods of adjusting the reluctance of inductors wound on separate cores.

Substrates hitherto used in thin film circuit assemblies served no other purpose than that of supporting the components, and in principle may be made of any mechanically robust insulating material. If, however, the substrate is made of magnetic insulating material as now proposed then this material can be used to form the core of inductors. These inductors have advantages over inductors made using conventional thin film techniques; for example higher value inductors may be obtained and also the magnetic material will serve to restrict the magnetic field of the inductor so that the magnetic coupling between adjacent substrates may be almost completely eliminated.

The inductors may be made by depositing conducting material on the substrate at the same time as other circuit components are formed, but this has the limitation of providing inductors with low "Q" values.

In FIGURE 1 there is shown a spiral inductor consisting of a film of conducting material 2 deposited on a magnetic substrate 1. Other circuit elements e.g. resistors, capacitors, etc., are, for the sake of simplicity shown diagrammatically as blocks 8 and these may be formed on the substrate in any suitable manner. In each of the embodiments hereinafter described these circuit elements will be similarly represented and numbered and although these may not be referred to individually in the description of each embodiment it should be taken that they exist on each of the substrates 1 referred to. The conducting material may be deposited in any convenient pattern and could, with a suitable substrate, take the form of a solenoid. If a substrate material with a high initial permeability is used then the effective permeability and therefore the effective "Q" is dependent only upon the conductor cross-sectional area. Better "Q" values may be obtained using conductors wound on the substrate.

FIGURES 2*a*, 2*b*, and 2*c* show different methods of winding the inductors on the substrate.

FIGURES 2*a* and 2*b* show a substrate 1 on which is wound a conductor 3. Both of these methods, however, use some of the surface area which could otherwise be used for other circuit components and also the coils are somewhat difficult to wind as the conductor has to pass through holes in the substrate.

FIGURE 2*c* shows a method of construction that does not require any surface area but is still somewhat difficult to wind. It consists of a substrate 1 having holes 4 running parallel to its major surfaces, with a wire 3 threading the holes and forming the inductor.

To overcome the difficulty of winding the coils, they may be wound on a separate magnetic core which is then fitted into the magnetic substrate. Such a core is shown in FIGURE 3*a*. It consists of a magnetic core 5, having a coil 3 wound on it and FIGURE 3*b* shows the same core and coil fitted into a magnetic substrate 1.

With coils using a separate core it is possible to adjust their inductance by making use of an air gap to vary the reluctance of the magnetic circuit. A method of doing this is shown in FIGURE 4. A coil 3 wound on a core 5 is shown fitted into a substrate 1, and it is arranged that an air gap 6 exists at one end of the coil between the core 5 and the substrate 1. The effective dimensions of the air gap 6 are varied by placing a movable wedge-shaped piece of magnetic material 7 across the gap.

Transformers may be constructed by having two or more windings on the same core or alternatively may be constructed as shown in FIGURE 4*b*. This shows two cores 5, each wound with coils 3, which are fitted into a substrate 1. The coupling between the coils may conveniently be adjusted by either cutting a hole in the substrate after assembly or alternatively by using a wedge-shaped slider 7 to traverse an air gap 6.

The substrate could be made of a suitable ferrite, the type of ferrite depending upon the particular requirements of the inductor or transformer. Manganese zinc ferrite would be suitable for low frequency transformers and nickel zinc ferrite would be suitable for high frequency inductors.

Where the techniques used require the surface of the substrate to be smoother than that generally obtainable with ferrite materials, such as when evaporation techniques are used, a suitable frit could be used to glaze one or more of the substrate surfaces.

What we claim is:

1. A substrate assembly including a substrate of magnetic electrically insulating material, an electrical component applied to said substrate, an inductor comprising a coil wound on a magnetic core structure, a recess in the substrate within which the magnetic core structure is positioned, and a magnetic bridging member provided for varying an air gap between the substrate and the magnetic core structure.

2. A substrate assembly including a substrate of magnetic electrically insulating material, an electrical component applied to said substrate, at least two inductors each comprising a coil wound on a magnetic core structure, at least two separate recesses in the substrate, one of said inductors being positioned in each of said recesses, and a magnetic bridging member for varying an air gap between respectve magnetic core structures.

References Cited

UNITED STATES PATENTS

| | | | |
|---|---|---|---|
| 349,611 | 9/1886 | Stanley | 336—20 |
| 2,910,662 | 10/1959 | Rex | 336—200 |
| 3,060,393 | 10/1962 | Sontheimer | 336—20 |
| 3,085,899 | 4/1963 | Forman. | |
| 3,185,947 | 5/1965 | Freymodsson | 336—200 |
| 3,222,756 | 12/1965 | Kaufman | 336—200 |

LEWIS H. MYERS, *Primary Examiner.*

T. J. KOZMA, *Assistant Examiner.*